(12) United States Patent
Russ et al.

(10) Patent No.: US 9,988,159 B2
(45) Date of Patent: Jun. 5, 2018

(54) RAM AIR TURBINE STRUT WITH INTEGRAL GEARBOX AND DRIVE SECTIONS

(71) Applicant: Hamilton Sundstrand Corporation, Charlotte, NC (US)

(72) Inventors: David Russ, Rockford, IL (US); Stephen Bortoli, Roscoe, IL (US); Richard Schultz, Rockford, IL (US)

(73) Assignee: Hamilton Sundstand Corporation, Charlotte, NC (US)

( * ) Notice: Subject to any disclaimer, the term of this patent is extended or adjusted under 35 U.S.C. 154(b) by 715 days.

(21) Appl. No.: 14/280,587

(22) Filed: May 17, 2014

(65) Prior Publication Data

US 2015/0329213 A1    Nov. 19, 2015

(51) Int. Cl.
| | | |
|---|---|---|
| *B64D 41/00* | (2006.01) | |
| *B60R 16/03* | (2006.01) | |
| *F02C 7/20* | (2006.01) | |
| *F02C 7/36* | (2006.01) | |
| *F02C 7/32* | (2006.01) | |
| *F03D 9/00* | (2016.01) | |
| *F16H 48/08* | (2006.01) | |

(52) U.S. Cl.
CPC ............ *B64D 41/007* (2013.01); *B60R 16/03* (2013.01); *B60R 16/0307* (2013.01); *B64D 41/00* (2013.01); *F02C 7/20* (2013.01); *F02C 7/32* (2013.01); *F02C 7/36* (2013.01); *F03D 9/00* (2013.01); *B64D 2041/002* (2013.01); *B64D 2221/00* (2013.01); *F05B 2220/31* (2013.01); *F05B 2240/50* (2013.01); *F05B 2260/4031* (2013.01); *F05B 2260/5032* (2013.01); *F16H 2048/087* (2013.01); *F16H 2700/00* (2013.01); *Y02E 10/72* (2013.01); *Y02T 50/44* (2013.01)

(58) Field of Classification Search
CPC .. B64D 41/007; B64D 2221/00; B64D 41/00; B64D 2041/002; B60R 16/03; B60R 16/0307; F02C 7/20; F02C 7/32; F02C 7/36; F16H 2048/087; F16H 2700/00; F05D 2220/50
USPC .............................. 307/9.1; 244/58, 53 R, 60
See application file for complete search history.

(56) References Cited

U.S. PATENT DOCUMENTS

| | | | |
|---|---|---|---|
| 3,633,411 A | | 1/1972 | Hann et al. |
| 3,774,466 A | * | 11/1973 | Bhatia ....................... F16H 1/14 74/417 |
| 4,991,796 A | | 2/1991 | Peters et al. |
| 5,484,120 A | * | 1/1996 | Blakeley .............. B64D 41/007 244/54 |
| 5,564,903 A | * | 10/1996 | Eccles ................... F01D 25/164 244/58 |

(Continued)

OTHER PUBLICATIONS

Extended European Search Report dated Oct. 2, 2015 in European Application No. 15001483.5.

*Primary Examiner* — Gerald L Sung
*Assistant Examiner* — Marc Amar
(74) *Attorney, Agent, or Firm* — Snell & Wilmer L.L.P.

(57) ABSTRACT

A ram air turbine is provided that utilizes a one-piece strut. The strut includes an integral gearbox section and an integral drive section. Within the strut, a turbine shaft and a bevel gear engages a driveshaft and a pinion gear, which transfers rotation from the turbine to a generator. The strut may be machined from a single piece of metal, such as aluminum.

15 Claims, 4 Drawing Sheets

(56) References Cited

U.S. PATENT DOCUMENTS

| | | | | |
|---|---|---|---|---|
| 5,685,694 A * | 11/1997 | Jones | ............ | F01D 7/02 416/147 |
| 5,779,446 A * | 7/1998 | Althof | ............ | F01D 7/00 416/162 |
| 8,622,697 B2 * | 1/2014 | Bortoli | ............ | B64D 41/007 416/1 |
| 2009/0034896 A1 * | 2/2009 | Fisher | ............ | F01D 25/162 384/531 |
| 2012/0011953 A1 * | 1/2012 | Bortoli | ............ | B64D 41/007 74/412 R |
| 2012/0128495 A1 * | 5/2012 | Bortoli | ............ | B64D 41/007 416/170 R |
| 2012/0183402 A1 * | 7/2012 | Bortoli | ............ | B64D 41/007 416/170 R |
| 2012/0269634 A1 | 10/2012 | Bortoli et al. | | |
| 2013/0259648 A1 * | 10/2013 | Russ | ............ | F16H 57/0443 415/122.1 |
| 2015/0097063 A1 * | 4/2015 | Hsu | ............ | F25C 5/12 241/277 |

* cited by examiner

RAM AIR TURBINE STRUT WITH INTEGRAL GEARBOX AND DRIVE SECTIONS

FIELD

The present disclosure relates to components of ram air turbines, and more particularly, to one-piece struts for use with ram air turbines.

BACKGROUND

Ram air turbines are generally used in aircraft to provide supplemental and/or emergency power to the aircraft by utilizing air flow to rotate a turbine. Ram air turbines may provide electrical power, hydraulic power, or both. Electrical ram air turbines produce electrical power by transferring the rotation of the turbine to a power conversion device, such as a generator. Ram air turbines may be located in the nose of the aircraft. In such configurations, the distance from the power conversion device (e.g., generator) to the turbine is less than other ram air turbine locations. The normal strut and gearbox design can be altered to take advantage of the shorter generator to strut distance

SUMMARY

A ram air turbine comprises a turbine comprising a blade, a strut removably coupled to the turbine, wherein the strut comprises an integral gearbox section and an integral drive section, a turbine shaft comprising a bevel gear oriented perpendicularly to the turbine shaft and positioned within the gearbox section, and a driveshaft comprising a pinion gear that engages with the bevel gear, wherein the driveshaft is positioned within the drive section and is removably coupled to a power conversion device, e.g., a generator. The gearbox section and the drive section may be machined together from a single piece of metal, such as aluminum. The bevel gear and pinion gear may have profiles that are complimentary to each other. Rotation of the turbine may be transmitted by the turbine shaft to the driveshaft. The strut may further comprise a cover having a bearing at an end of the strut, such as a single liner bearing A strut assembly comprises an integral gearbox section and an integral drive section, a turbine shaft comprising a bevel gear oriented perpendicularly to the turbine shaft and positioned within the gearbox section, and a driveshaft comprising a pinion gear that engages with the bevel gear, wherein the driveshaft is positioned within the drive section and is removably coupled to a generator. The gearbox section and the drive section may be machined together from a single piece of metal, such as aluminum. The bevel gear and pinion gear may have profiles that are complimentary to each other. The drive section of the strut assembly may be adjacent a generator.

BRIEF DESCRIPTION OF THE DRAWINGS

The subject matter of the present disclosure is particularly pointed out and distinctly claimed in the concluding section of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

As used herein, "aft" refers to the direction associated with the tail (e.g., the back end) of an aircraft, or generally, to the direction of exhaust of the jet engines. As used herein, "forward" refers to the directed associated with the nose (e.g., the front end) of an aircraft, or generally, to the direction of flight or motion.

Figure 1:
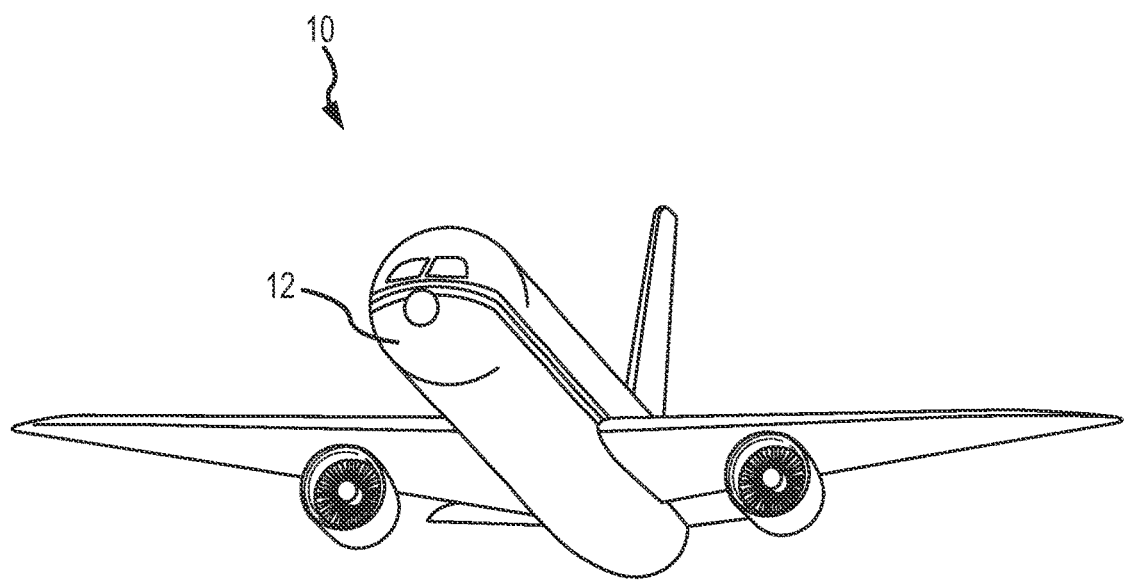
FIG. 1 illustrates a perspective view of an aircraft, in accordance with various embodiments.

In various embodiments and with reference to FIG. 1, an aircraft 10 may comprise a nose 12. A ram air turbine 100 may be located within nose 12 of aircraft 10, and when needed, ram air turbine 100 may be lowered out of nose 12 and into the path of airflow.

Figure 2A:
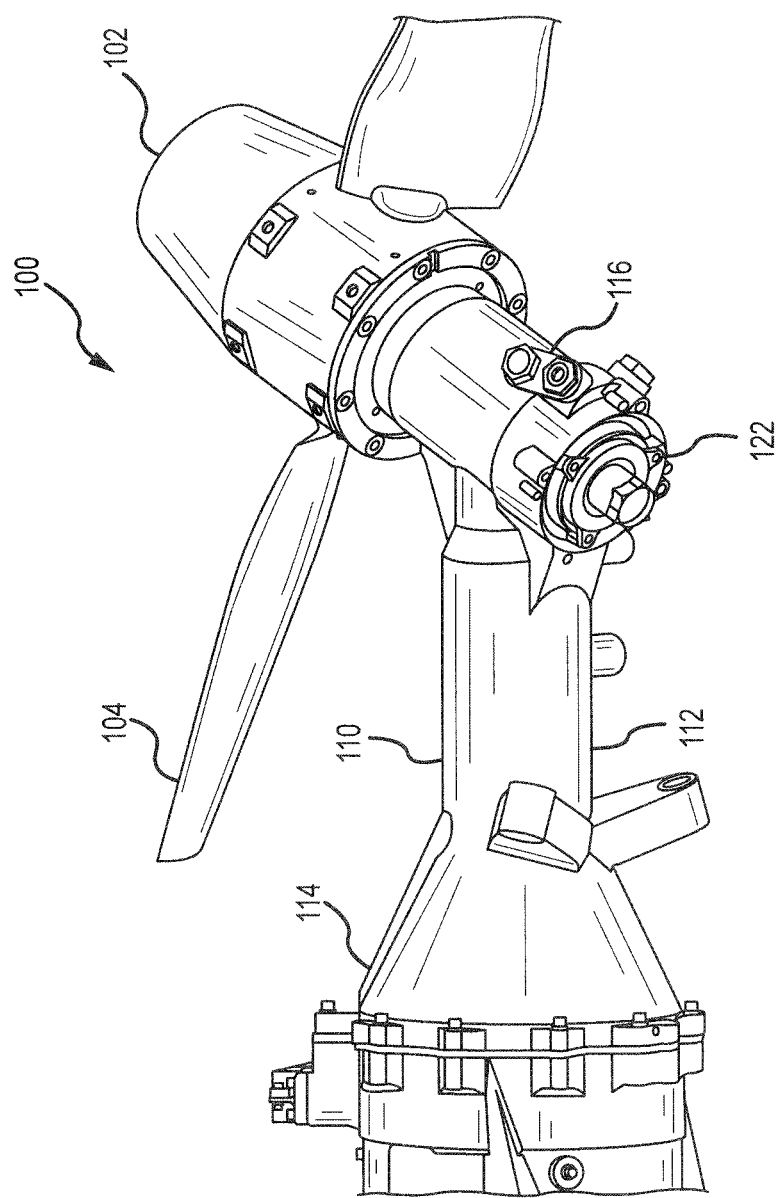
FIGS. 2A and 2B illustrate a perspective view and a cross sectional view of a ram air turbine of an aircraft, in accordance with various embodiments.
Figure 2B:
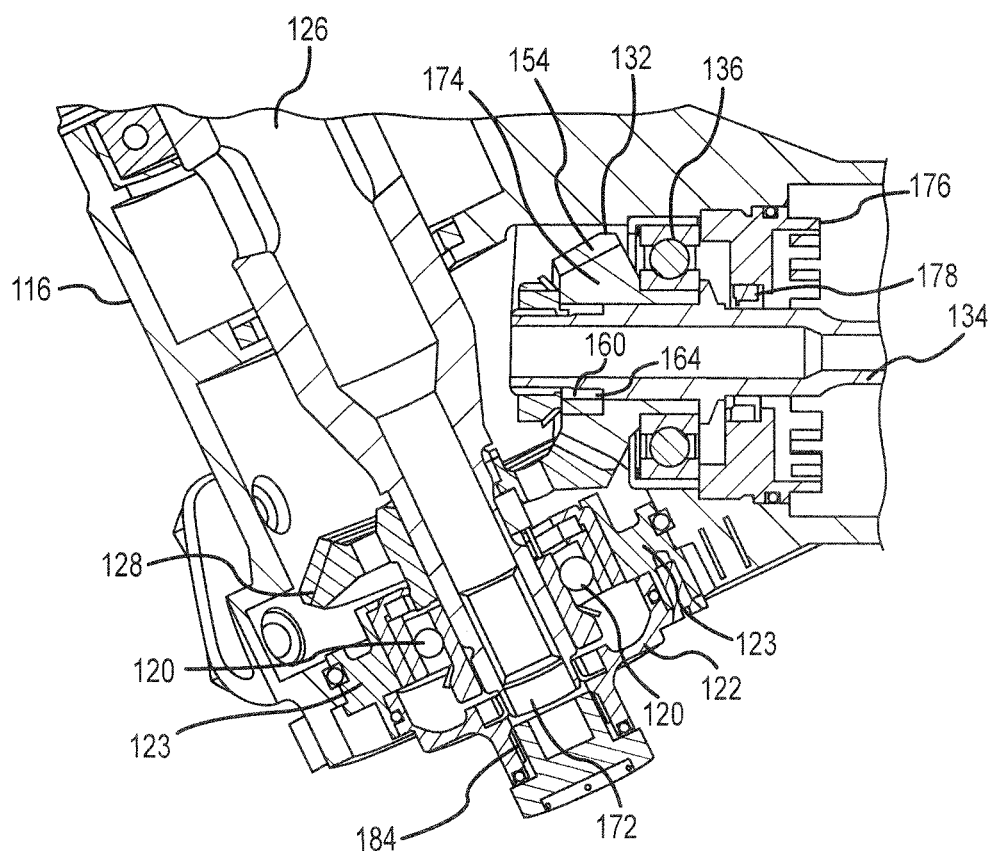

With reference to FIGS. 2A and 2B, ram air turbine 100 may comprise, for example a turbine 102 having one or more blades 104. In various embodiments, turbine 102 is removably coupled to a strut 110. For example, strut 110 may be rotably connected to the rear of turbine 102 through a turbine shaft 126.

In various embodiments, strut 110 may comprise a gearbox section 116, a drive section 112, and a power conversion adapter section adapter section 114. Power conversion adapter section 114 can comprise, for example, a generator adapter section. Although section 114 will hereafter be referred to as a generator adapter section 114, it is not limited to any particular power conversion device.

Strut 110 may be a one piece strut, comprising gearbox section 116, drive section 112, and generator adapter section 114 that are all integral to each other. In various embodiments, turbine 102 may be removably coupled to gearbox section 116 of strut 110.

Strut 110 may comprise a transition between drive section 112 and generator adapter section 114. For example, drive section 112 may have a reduced diameter in relation to generator adapter section 114, such that strut 110 comprises a cone-shaped transition region between drive section 112 and generator adapter section 114. As will be further discussed, in various embodiments, the various components of the ram air turbine that transfer rotational force of turbine 102 to a power conversion device, e.g., a generator, are located within gearbox section 116, drive section 112, and generator adapter section 114. As will be further described, many of these components may reside in one or more section of strut 110.

In various embodiments, strut 110 may be short enough to be milled using a conventional milling machine. For example, strut 110 may be machined from a single piece of metal in a conventional milling machine or lathe. For example, forming a shorter, one-piece strut 110 in a conventional mill or lathe may be more time effective and/or cost effective than forming a longer, multi piece strut, or forming a longer, one-piece strut requiring non-conventional milling machines or lathes.

In such embodiments, forming strut 110 from a single piece of metal may eliminate bolts, helicoils, and other fastening components that would be employed in a strut that is not milled from a single piece of metal. Strut 110 may comprise, for example, a steel or aluminum metal material. In various embodiments, strut 110 having a one-piece design may, for example, experience reduced turbulence and air drag when in use, potentially improving life span of turbine blades 104. Further, one-piece strut 110 may experience a reduced deployment load during operation as a result of its shorter length and lighter weight, which may reduce the deployment actuator load and/or allow for the use of less material than a traditional, multi-piece strut.

In various embodiments, gearbox section 116 comprises a turbine shaft 126 and a bevel gear 128. Turbine shaft 126 may, for example, be removably coupled to turbine 102, allowing turbine shaft 126 to rotate with the rotation of turbine blades 104. Strut 110 may comprise, for example, a bearing liner 184 located within gearbox section 116 and at an opposite end of turbine 102. In such embodiments, bearing liner 184 may receive an end of turbine shaft 126.

Bevel gear 128 may be removably coupled to turbine shaft 126. For example, bevel gear 128 may be removably coupled to turbine shaft 126 by a spanner nut, a splined connection, or any other manner of coupling. Bevel gear 128 may be oriented perpendicularly to turbine shaft 126. In various embodiments, bevel gear 128 may comprise a beveled profile configured to interface with another gear and transmit rotation of turbine shaft 126 in a different direction. For example, as will be further discussed, bevel gear 128 can interface with a pinion gear to direct the rotational force of turbine 102 to a generator.

In various embodiments, an opposing end of turbine shaft 126 may be seated in a bearing 120 located within a bearing retainer 123. For example, bearing 120 may comprise a ball bearing. In various embodiments, cover 122 may be located at an opposite end of gearbox section 116 from turbine 102, and provide a seal for gearbox section 116 against outside contaminants. Further, in various embodiments, gearbox section 116, also referred to as a gearbox section, comprises lubricating fluid, and cover 122 may retain such fluid within gearbox section 116. Cover 122 may, for example, be secured to gearbox section 116 of strut 110 by one or more fasteners such as screws or bolts.

Figure 3:
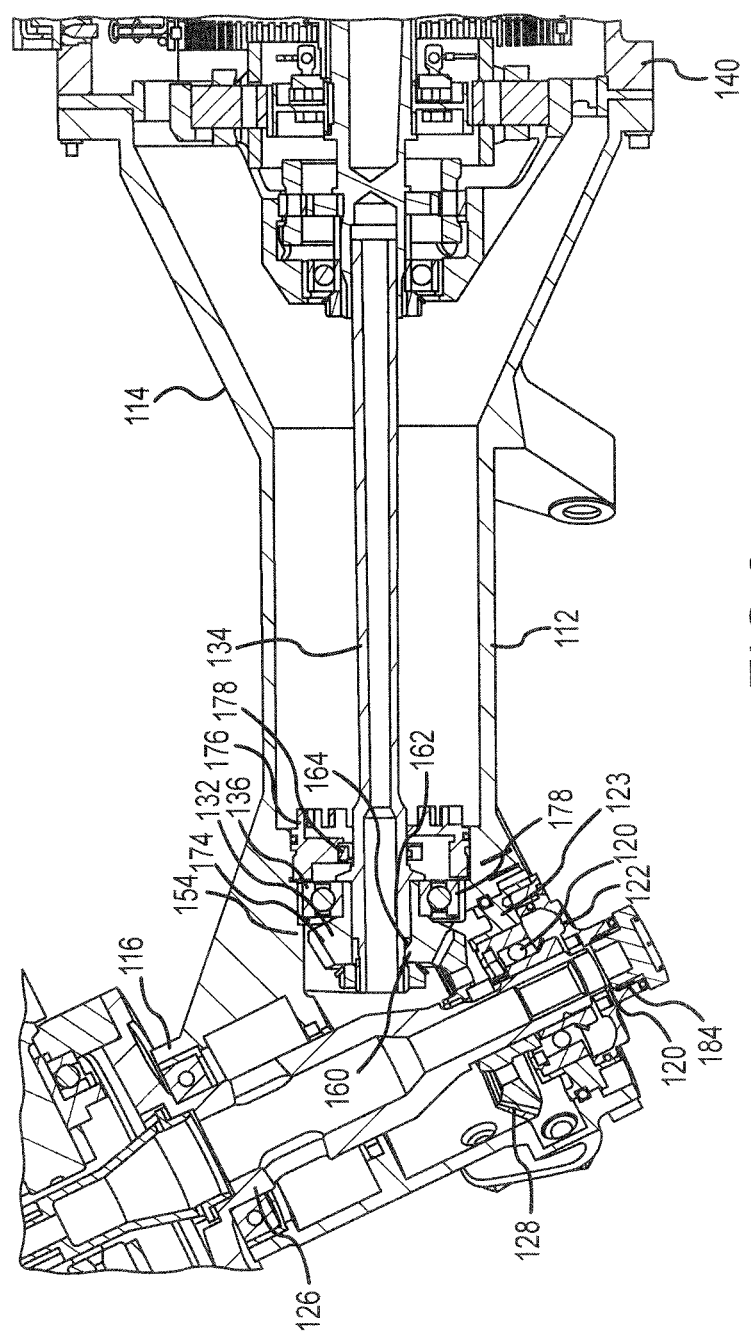
FIG. 3 illustrates a cross sectional view of a ram air turbine of an aircraft, in accordance with various embodiments.

With reference to FIG. 3, in various embodiments, drive section 112 of strut 110 may comprise a driveshaft 134. Driveshaft 134 may traverse drive section 112 and transfer rotation of turbine shaft 126 to generator 140.

In various embodiments, driveshaft 134 comprises a pinion gear 132. With reference to FIG. 3, in various embodiments, pinion gear 132 may comprise a gear body 174 and a gear face 154. Gear face 154 may comprise, for example, a gear tooth pattern that is complementary to the pattern of bevel gear 128. In various embodiments, pinion gear 132 engages with bevel gear 128 to transfer rotation of turbine shaft 126 to driveshaft 134.

Pinion gear 132 may, for example, be secured to driveshaft 134 by a spanner nut. With reference to FIG. 3, in various embodiments, pinion gear 132 may comprise a key 160 configured to interact with a keyed joint 162 of driveshaft 134. In such embodiments, key 160 and keyed joint 162 may maintain the position of pinion gear 132 such that pinion gear 132 does not rotate independently of driveshaft 134. However, any manner of securing pinion gear 132 to driveshaft 134 is within the scope of the present disclosure.

In various embodiments, pinion gear 132 may further comprise a pinion retainer 176. In various embodiments, pinion retainer 176 may comprise an outer diameter slightly larger than the outer diameter of pinion gear 132. For example, pinion retainer 176 may maintain a desired position of pinion bearing 136 in a direction parallel to driveshaft 134. Pinion retainer 176 may, for example, fix pinion bearing 136 in a desired axial position. In various embodiments, pinion retainer 176 engages with strut housing 114 by a threaded engagement. In such embodiments, the need for additional shims may be reduced or eliminated.

In various embodiments, driveshaft 134 further comprises a pinion bearing 136. Pinion bearing 136 may be coupled to pinion gear 132 and facilitate rotation and positioning of pinion bearing 136 within drive section 112 of strut 110. For example, pinion bearing 136 may be pressed onto gear body 174. However, any manner of coupling pinion gear 132 and pinion bearing 136 is within the scope of the present disclosure.

Pinion retainer 176 may also comprise an upper seal 178. In various embodiments, upper seal 178 is located on driveshaft 134. Upper seal 178 may, for example, prevent lubricating fluid transferring from gearbox section 116 to drive section 112 of strut 110. Upper seal 178 may comprise a dynamic seal which rotates as driveshaft 134 and pinion gear 132 rotate. Any suitable seal type and configuration is within the scope of the present disclosure.

Driveshaft 134 may comprise, for example, a hollow shaft with an inner diameter and outer diameter. In other embodiments, driveshaft 134 may comprise a solid shaft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A ram air turbine comprising:
   a turbine comprising a blade;
   a strut removably coupled to the turbine, wherein the strut comprises a gearbox section integral with a drive section, wherein the strut comprises a generator adapter section integral with the drive section, wherein the drive section comprises a first end proximate the gearbox section and a second end, opposite the first end, proximate the generator adapter section;
   a turbine shaft comprising a bevel gear oriented perpendicularly to the turbine shaft and positioned within the gearbox section;
   a pinion gear comprising a lower face and a sleeve, opposite the lower face, having an interior and an exterior surface, and a pinion bearing coupled about the exterior surface of the sleeve, wherein the pinion gear engages the bevel gear;
   a pinion retainer coupled to the drive section, proximate the pinion bearing, at the first end of the drive section; and
   a driveshaft comprising a flange and a keyed joint and coupled at the interior surface of the sleeve to the pinion gear that engages the bevel gear, wherein flange contacts the sleeve, wherein the driveshaft extends entirely through the sleeve and the pinion gear, wherein a portion of the driveshaft extending entirely through the sleeve comprises a spanner nut coupled to the driveshaft and in contact with the lower face of the bevel gear, wherein an interference between the spanner nut and the lower face and an interference between the sleeve and the flange retains the pinion gear axially with respect to the driveshaft, and wherein the driveshaft is positioned within the drive section and is removably coupled to a power conversion device.

2. The ram air turbine of claim 1, wherein the gearbox section, the generator adapter section and the drive section are machined together from a single piece of metal.

3. The ram air turbine of claim 1, wherein the bevel gear comprises a beveled profile.

4. The ram air turbine of claim 3, wherein the pinion gear comprises a profile which is complementary to the beveled profile of the bevel gear.

5. The ram air turbine of claim 1, wherein rotation of the turbine is transmitted by the turbine shaft to the driveshaft.

6. The ram air turbine of claim 1, wherein the strut comprises aluminum.

7. The ram air turbine of claim 1, further comprising a bearing at an end of the strut.

8. The ram air turbine of claim 7, wherein the bearing comprises a ball bearing.

9. The ram air turbine of claim 1, wherein the gearbox section comprises a cover, and wherein the turbine shaft engages with the cover.

10. A strut assembly comprising:
    a gearbox section integral with a drive section;
    a generator adapter section integral with the drive section, wherein the drive section comprises a first end proximate the gearbox section and a second end, opposite the first end, proximate the generator adapter section;
    a turbine shaft comprising a bevel gear oriented perpendicularly to the turbine shaft and positioned within the gearbox section;
    a pinion gear comprising a lower face and a sleeve, opposite the lower face, having an interior and an exterior surface, and a pinion bearing coupled about the exterior surface of the sleeve, wherein the pinion gear engages the bevel gear; a pinion retainer coupled to the drive section, proximate the pinion bearing, at the first end of the drive section; and
    a driveshaft comprising a flange and a keyed joint and coupled at the interior surface of the sleeve to the pinion gear that engages with the bevel gear, wherein flange contacts the sleeve, wherein the driveshaft extends entirely through the sleeve and the pinion gear, wherein a portion of the driveshaft extending entirely through the sleeve comprises a spanner nut coupled to the driveshaft and in contact with the lower face of the bevel gear, wherein an interference between the spanner nut and the lower face and an interference between the sleeve and the flange retains the pinion gear axially with respect to the driveshaft, and wherein the driveshaft is positioned within the drive section.

11. The strut assembly of claim 10, wherein the generator adapter section is adjacent to a power conversion device.

12. The strut assembly of claim 10, wherein the strut assembly is machined from a single piece of metal.

13. The strut assembly of claim 10, wherein the pinion gear is configured to interface with the bevel gear.

14. The strut assembly of claim 10, wherein the strut assembly comprises aluminum.

15. The strut assembly of claim 10, further comprising a bevel gear bearing retainer, wherein the gearbox section, the drive section, and the generator adapter section comprise a strut, wherein the pinion retainer is coupled to the strut by a threaded engagement, and wherein the pinion retainer retains a pinion bearing and wherein the bevel gear bearing retainer retains a bevel gear bearing.

* * * * *